United States Patent
Porter

[11] Patent Number: 5,887,510
[45] Date of Patent: Mar. 30, 1999

[54] DEVICE FOR MAKING COFFEE

[76] Inventor: Mark D. Porter, 219 E. Sussex Ave., Missoula, Mont. 59801

[21] Appl. No.: 907,133

[22] Filed: Aug. 6, 1997

[51] Int. Cl.⁶ ..................................................... A47J 31/18
[52] U.S. Cl. ............................................... 99/287; 99/297
[58] Field of Search ....................................... 99/297, 287

[56] References Cited

U.S. PATENT DOCUMENTS

| | | | |
|---|---|---|---|
| 3,657,993 | 4/1972 | Close ......................................... | 99/297 |
| 3,927,608 | 12/1975 | Doyel ......................................... | 99/297 |
| 3,935,318 | 1/1976 | Mihailide ................................... | 99/297 |
| 4,301,942 | 11/1981 | Kupperman et al. .................... | 220/444 |
| 4,650,583 | 3/1987 | Bondanini ............................. | 99/327 X |
| 4,934,257 | 6/1990 | Mikkelsen ................................ | 99/279 |
| 5,431,276 | 7/1995 | Lialin ....................................... | 206/222 |
| 5,478,586 | 12/1995 | Connor ..................................... | 99/287 |
| 5,618,570 | 4/1997 | Banks et al. .............................. | 99/287 |
| 5,635,233 | 6/1997 | Levinson .................................. | 99/287 |
| 5,770,074 | 6/1998 | Pugh ..................................... | 99/297 X |

FOREIGN PATENT DOCUMENTS

| | | | |
|---|---|---|---|
| 600722 | 8/1956 | Italy ........................................ | 99/297 |

Primary Examiner—Reginald L. Alexander
Attorney, Agent, or Firm—Hamilton, Brook, Smith & Reynolds, P.C.

[57] ABSTRACT

The present invention is directed to a portable device for making coffee. The portable device includes a vessel for holding a mixture of solid particles and liquid. The vessel has a bottom end and a side wall extending from the bottom end. The side wall terminates and defines a top opening for receiving the solid particles and liquid. The device includes a plunger assembly that has a filter unit and a rod extending from the unit. The filter unit has a hub for receiving the rod and a plurality of spokes extending substantially normal to the rod and radially from the hub to a peripheral base member. A filter extends between the hub and the peripheral base member. The peripheral base member has a plurality of fingers extending from the perimeter of the peripheral base member. The fingers each have a first phalange and a second phalange. The first phalange extends upwardly and outwardly from the peripheral base member and joins the second phalange at an angular intersection. The second phalange extends from the angular intersection upwardly and inwardly. The angular intersection sufficiently contacts the side wall of the vessel to form intimate contact between the vessel and filter unit.

8 Claims, 3 Drawing Sheets

DEVICE FOR MAKING COFFEE

BACKGROUND OF THE INVENTION

It is generally recognized that freshly brewed coffee is superior in flavor to the various instant coffees currently available in the market. Instant coffees are popular in spite of their flavor because of their convenience. A cup of hot instant coffee is prepared by dissolving a measure of instant coffee material into a cup of hot water and stirring. On the other hand, freshly brewed coffee typically requires an apparatus for running hot water through ground coffee while keeping the grounds from entering the final product. However, a problem with a number of the apparatuses is that they are often large, heavy and not sufficiently durable to be used under many conditions. For example, a backpacker in the mountains could carry a coffee pot. However, such pots are often heavy and take a large amount of time and effort to use. A filter cone can be inconvenient for the user by requiring one to carry filter papers in addition to the ground coffee and filter cone.

Therefore, there is a need for a light weight, easy to use device for making coffee that reduces or eliminates some of the problems discussed above.

SUMMARY OF THE INVENTION

The present invention is directed to a device for making coffee. The device includes a vessel for holding a mixture of solid particles and liquid. The vessel has a bottom end and a side wall extending from the bottom end. The side wall terminates at and defines a top opening for receiving the solid particles and liquid. The device includes a plunger assembly that has a filter unit and a rod extending from the unit. The filter unit has a hub for receiving the rod and a plurality of spokes extending substantially normal to the rod and radially from the hub to a peripheral base member. A filter extends between the hub and the peripheral base member. The peripheral base member has a plurality of fingers extending from the perimeter of the peripheral base member. The fingers each have a first phalange and a second phalange. The first phalange extends upwardly and outwardly from the peripheral base member and joins the second phalange at an angular intersection. The second phalange extends from the angular intersection upwardly and inwardly. The angular intersection contacts the side wall of the vessel to form intimate contact between the vessel and filter unit.

The invention has many advantages including forming intimate contact between the plunger and the side wall, thereby forming a seal sufficient to prevent passage of solid particles between the plunger and side wall. Another advantage includes a device that allows the coffee to be directly drunk from the coffee maker.

DETAILED DESCRIPTION OF THE INVENTION

The features and details of the apparatus of the invention will now be more particularly described with reference to the accompanying drawings and pointed out in the claims. The same numeral present in different figures represents the same item. It will be understood that the particular embodiments of the invention are shown by way of illustration and not as limitations of the invention. The principal features of this invention can be employed in various embodiments without departing from the scope of the invention. All percentages and parts are by weight unless otherwise indicated.

Figure 1:
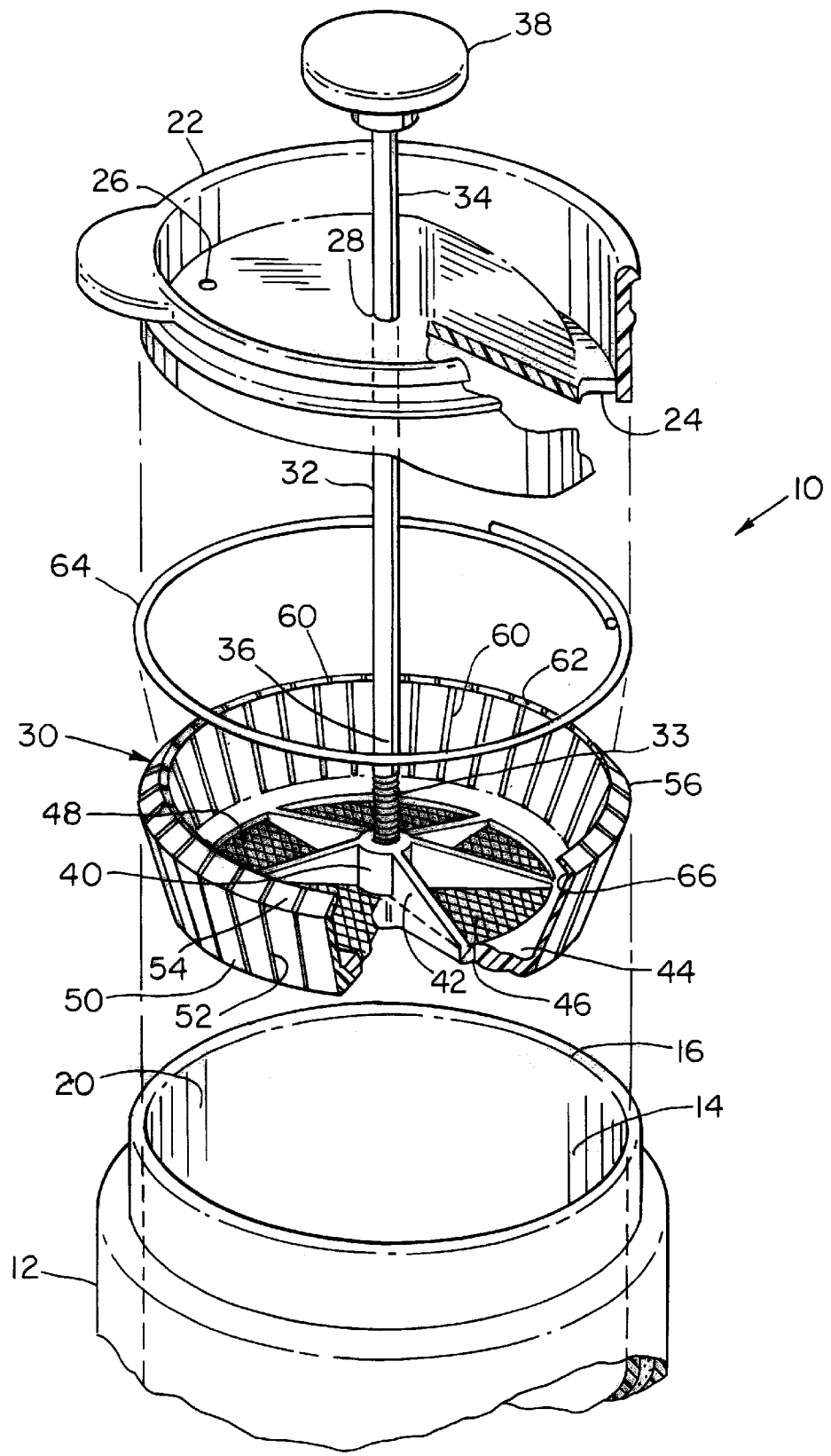
FIG. 1 is a perspective view of one embodiment of the device of the present invention.

The present invention includes device 10 for making coffee, tea or similar drink, shown in FIG. 1. Device 10 includes a vessel, such as a mug 12. Many individual serving containers or multiple serving containers that have a straight or slightly tapered interior wall can be used with this invention. For example, a suitable mug is a Whirley T-7 thermal drinking mug that can hold about twenty ounces of liquid and is commercially available from Whirley Corp., Warren, Pennsylvania. Mug 12 has interior chamber 14 for holding a mixture of liquid and solid particles, such as coffee grounds or tea leaves. Mug 12 has top opening 18 for receiving the liquid, a bottom end (not shown) and a interior side wall 20 that extends from top opening end 16 to bottom end. In one embodiment, interior chamber 14 has a diameter of about three inches and a depth of about 5.5 inches. Interior side wall 20 can be cylindrical, but in other embodiments, the interior side wall is slightly tapered from top opening end 16 to the bottom end that has a smaller interior diameter than the top opening end. The taper can be in the range of between about 0.3 and 5°. In a preferred embodiment, the taper is about 0.5°. Alternatively, interior side wall 20 can be oval in shape, a polygon or other suitable shape. Mug 12 is formed of a material that is lightweight and durable, such as a thermoplastic including polypropylene, for backpacking and other similar activities. The vessel is preferably thermally insulated to keep a liquid hot.

Mug 12 has cover 22 for essentially sealing top opening end 16 of mug 12. Cover 22 has first opening 24 for drinking a liquid from the interior of the vessel and second opening 26 for allowing air to enter the chamber. Cover 22 is modified with third opening 28 in the center of cover 22 for receiving plunger assembly 30. Mug 12 can have a handle for easier holding.

Figure 2:
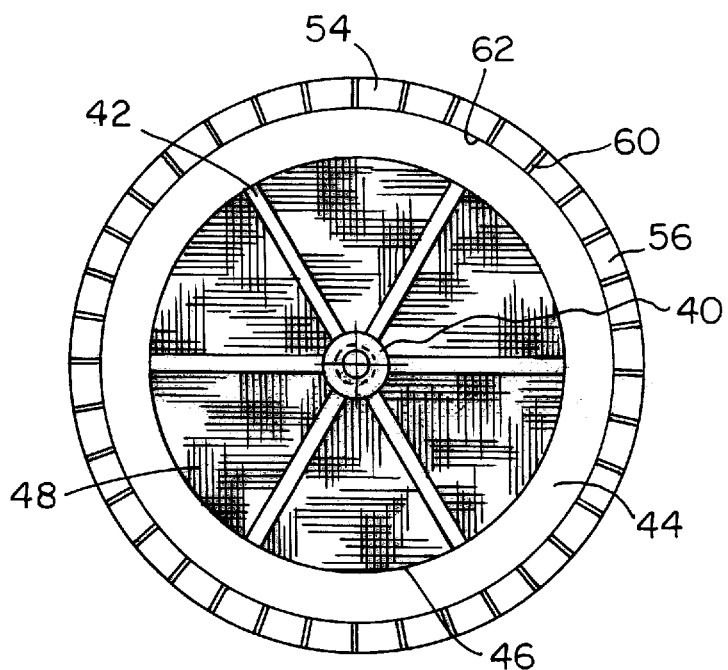
FIG. 2 is a top elevational view of a filter unit of the device shown in FIG. 1.
Figure 3:
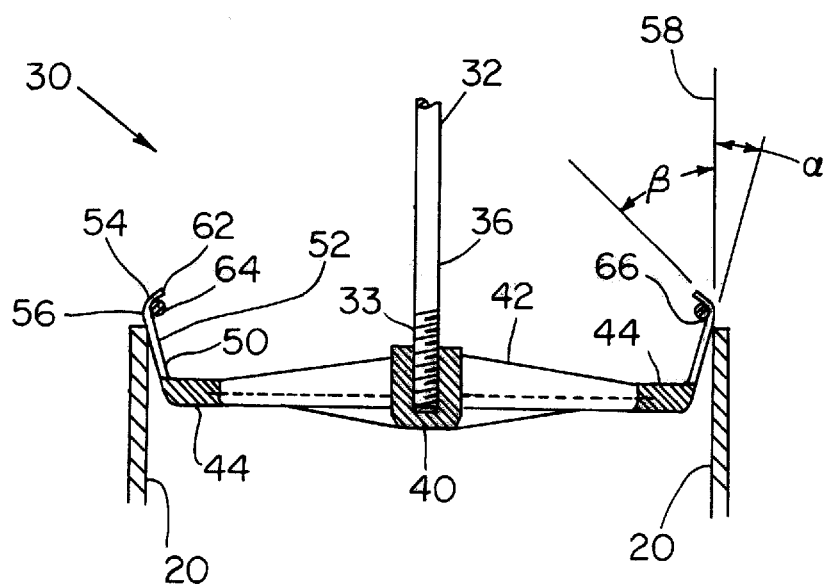
FIG. 3 is a cut-away side elevational view of the filter unit of the device shown in FIGS. 1 and 2.

Plunger assembly 30, also shown in greater detail in FIGS. 2 and 3, has plunger rod 32 formed of a stiff material, such as a thermoplastic or metal. In a preferred embodiment, plunger rod 32 is formed of a metal, preferably 304 stainless steel, and has a diameter of about 0.375 inches. Plunger rod 32 is about 5.25 inches long and has thread cuts 33 on both ends. Thread cuts 33 are about 0.25 inches long at first plunger rod end 34 and about 0.25 inches long at second plunger rod end 36. Thread cuts of the preferred embodiment are a number 10–24 die size. Thread cuts 33 at first plunger rod end 34 are made to mate with plunger knob 38. Plunger knob 38 can be made of an injected molded part and is designed for easy handling for pushing and pulling plunger assembly 30 through interior chamber 14 of mug 12. Further, plunger knob 38 is designed not to interfere either directly with the mug or impede pouring. Plunger knob 38 can be configured, such as in a U-shape, to minimize interference with the drinker's nose. Threads cuts 33 at second plunger rod end 36 of plunger rod 32 are cut to accept threaded hub 40. Alternatively, the hub can be held in place by a pair of threaded hexagonal nuts.

Hub 40 has a plurality of spokes 42 extending radially from the hub to peripheral base member 44. Spokes 42 and peripheral base member 44, such as a ring, are formed of a thermoplastic, such as polypropylene. Plunger rod 32 is preferably normal to spokes 42 of plunger assembly 30. Spokes 42 can be tapered in decreasing size from hub 40 to peripheral base member 44. For instance, in a preferred embodiment, spokes 42 number six, are equidistantly distributed around hub 40 in a plane and have a width of about 0.1 inches and a thickness having a taper from hub 40 of about 0.425 to about 0.15 inches at peripheral base member 44.

Disposed between spokes 42 is filter 46. Examples of filter 46 include a metal mesh, fine cloth, filter paper, etc. Mesh 48 of filter 46 is sufficiently sized to allow a liquid to pass through it while entraining essentially all the solid particles in the liquid that have the size of coffee grounds or greater. In a preferred embodiment, filter 46 is formed of a stainless steel wire screen mesh that has about sixty to eighty holes per inch and is cut in a circle having a diameter of about 2.5 inches across.

Peripheral base member 44 has an outside diameter slightly smaller than the interior diameter of interior chamber 14 of mug 12. Extending upwardly from peripheral base member 44 are a plurality of fingers 50. Fingers 50 have a living hinge at peripheral base member 44. Fingers 50 have first phalange 52 and second phalange 54. First phalange 52 extends upwardly and outwardly from peripheral base member 44. First phalange 52 extends at angle a in the range of between about 15° and 45° outwardly from vertical 58 to peripheral base member 44. Angle α is preferably about 25°. First phalange 52 joins second phalange 54 at angular intersection 56. In one embodiment, angular intersection 56 is about 0.5 inches from the bottom of peripheral base member 44. Fingers 50 have a thickness of about 0.04 inches and a width of about 0.25 inches.

Figure 4:
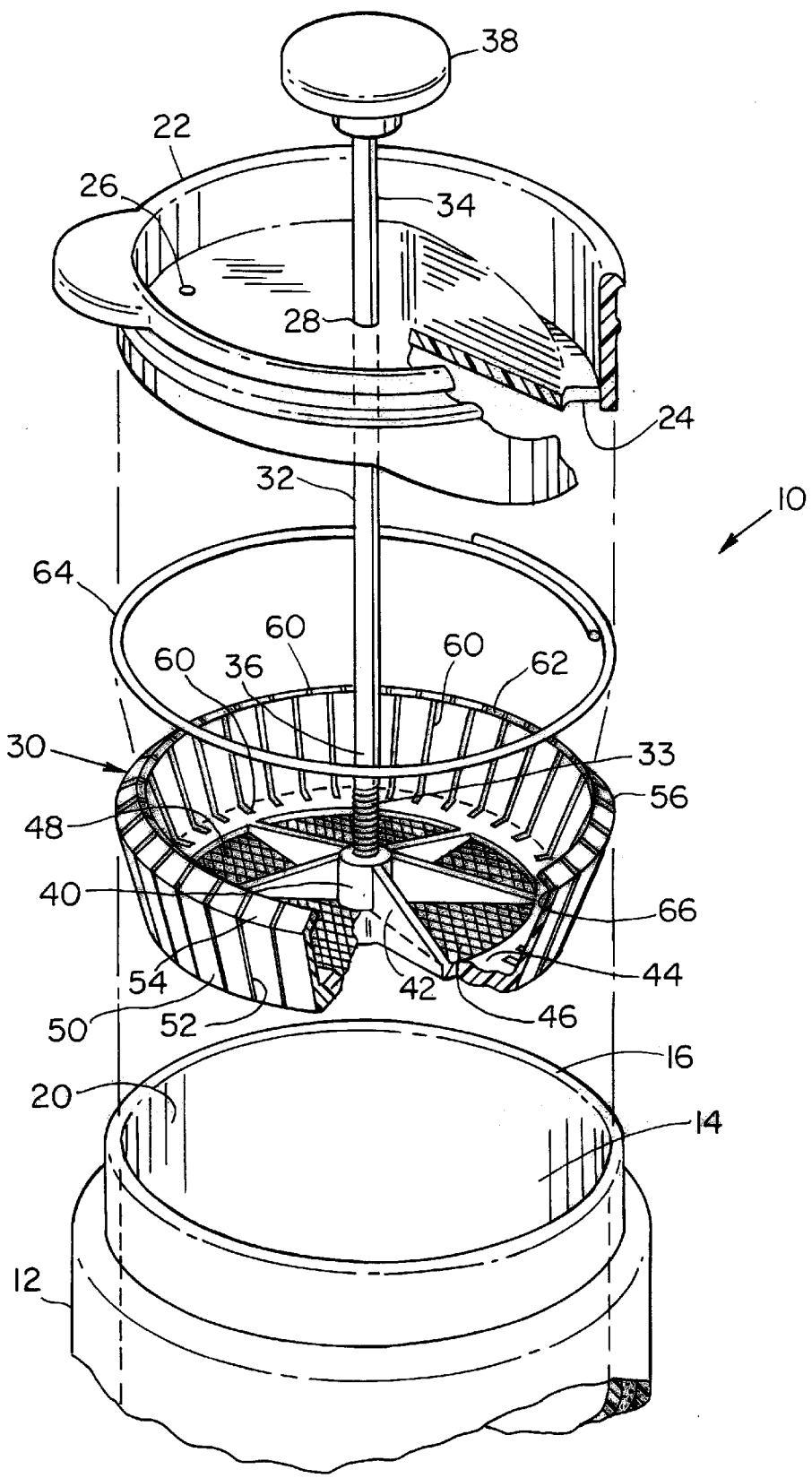
FIG. 4 is a perspective view of a second embodiment of the device of the present invention.

Second phalange 54 extends from angular intersection 56 upwardly and inwardly at an angle β in a range of between about 25° and 50° from vertical 58. In a preferred embodiment, plunger assembly 30 includes thirty-six fingers equally sized and spaced about 0.025 inches apart from each other with slots 60. Each of fingers 50 is spaced from each adjacent finger 50 such that when filter unit is moved downwardly, each finger moves inwardly radially such that slots 60 between fingers 50 approach closure. Further, each finger 50 can individually and separately move and flex when acted upon by a force. Slot 60 extends essentially from peripheral base member 44 to distal end 62 of second phalange 54. As shown in FIG. 4, slots 60 can extend partially into peripheral base member 44. Returning to FIG. 1, the outside diameter of plunger assembly 30 at angular intersection 56 is slightly greater than the diameter of interior chamber 14 of mug 12. This allows fingers 50 to come in contact with interior side wall 20 and to sufficiently compress to form intimate contact between the filter unit and the interior side wall to prevent the passage of solids between the fingers and the interior side wall. To provide additional pressure against side wall 20, a pressure exerting means 64, such as a spring, is provided at interior portion 66 of angular intersection 56 to provide additional force outwardly toward interior side wall 20 to allow for further intimate contact of fingers 50 with interior side wall 20. In a preferred embodiment, the pressure exerting means is a double wrapped spring.

To make coffee in device 10, plunger assembly 30 is removed from mug 12 and solid particles, such as coffee grounds, and a liquid, such as hot water, are placed into mug 12. After a suitable infusion period, typically a few minutes, plunger assembly 30 is inserted from the top opening end 16 of mug 12 and is slowly pushed downwardly until the solid particles are pushed to the bottom end of interior chamber 14 of mug 12. The coffee can be drunk directly from mug 12 or poured into a second mug or cup. Plunger assembly 30 is removed from mug 12 for cleaning and reuse.

EQUIVALENTS

Those skilled in the art will recognize or be able to ascertain using no more than routine experimentation, many equivalents to the specific embodiments of the invention described specifically herein. Such equivalents are intended to be encompassed in the scope of the claims.

I claim:

1. A device for making coffee, comprising:

a) a vessel for holding a mixture of solid particles and liquid, said vessel having a bottom end and a side wall that extends from said bottom end, the side wall terminating at and defining a top-opening for receiving the solid particles and liquid; and b) a plunger assembly having a filter unit and a rod extending from said unit, said filter unit having a hub for receiving the rod, a plurality of spokes extending substantially normally to the rod and radially from the hub to a peripheral base member, a filter extending between the hub and peripheral base member, said peripheral base member having a plurality of fingers extending from the perimeter of the peripheral base member, said fingers each having a first phalange and second phalange, said first phalange extending upwardly and outwardly from said peripheral base member and joining said second phalange at an angular intersection, said second phalange extending from said angular intersection upwardly and inwardly, said angular intersection sufficiently contacting said side wall of said vessel forming intimate contact between the vessel and filter unit.

2. The device of claim 1 wherein said device includes a cover sized to fit the top-opening and having an aperture for said rod to slide therethrough.

3. The device of claim 1 wherein said plunger assembly includes a pressure exerting means for forcing said fingers radially outwardly and creating intimate contact of the angular intersections with the side wall of said vessel.

4. The device of claim 1 wherein said side wall is tapered from said top-opening end to said bottom end.

5. The device of claim 4 wherein said side wall has a taper in the range of between 0.3 and 5 degrees.

6. The device of claim 1 wherein said vessel is formed of thermoplastic.

7. The device of claim 1 wherein the first phalange is at an angle of between about 15 and 45 degrees to the vertical from the peripheral base member.

8. The device of claim 1 wherein the second phalange is at an angle of between about 25 and 50 degrees to the vertical from the peripheral base member.

* * * * *